Dec. 24, 1963   E. R. ZIEGLER   3,115,598
WINDSHIELD WIPER ACTUATING MECHANISM
Filed June 29, 1961   3 Sheets-Sheet 1

INVENTOR.
EUGENE R. ZIEGLER
BY
HIS ATTORNEY

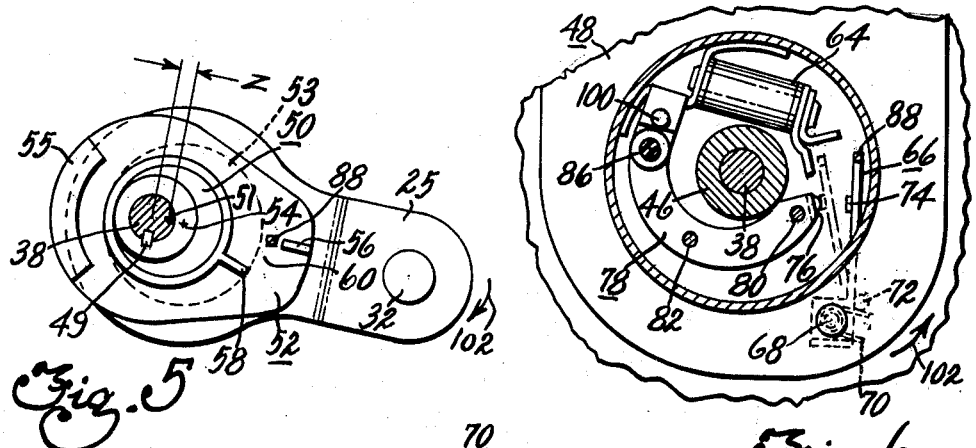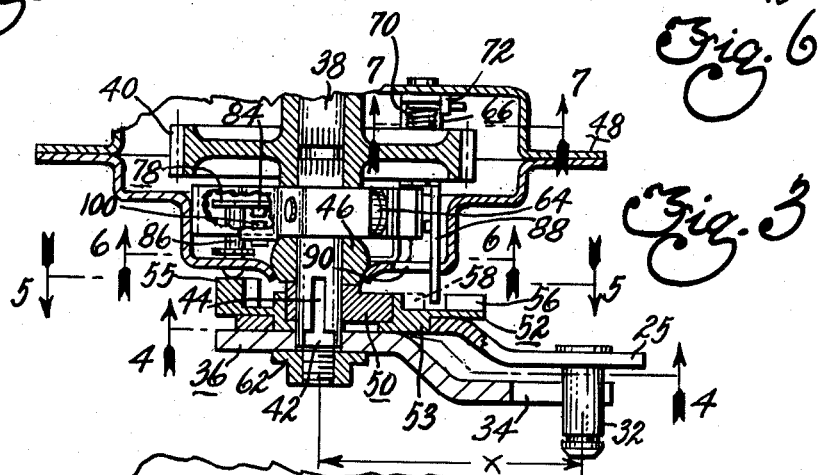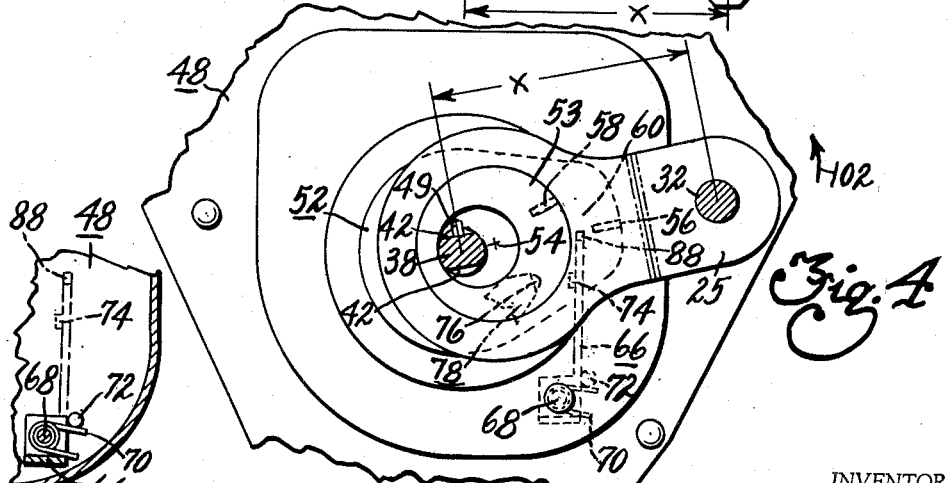

Dec. 24, 1963  E. R. ZIEGLER  3,115,598
WINDSHIELD WIPER ACTUATING MECHANISM
Filed June 29, 1961  3 Sheets-Sheet 3

INVENTOR.
EUGENE R. ZIEGLER
BY
HIS ATTORNEY

United States Patent Office 3,115,598
Patented Dec. 24, 1963

3,115,598
WINDSHIELD WIPER ACTUATING MECHANISM
Eugene R. Ziegler, Spencerport, N.Y., assignor to General Motors Corporation, Detroit, Mich., a corporation of Delaware
Filed June 29, 1961, Ser. No. 125,908
15 Claims. (Cl. 318—466)

This invention pertains to actuating mechanism for windshield wipers, and particularly to electric motor driven actuating mechanism including variable throw crank means.

In windshield cleaning systems including a pair of wiper blades which are oscillated in phase opposition, it is desirable to move the wiper blades to depressed parked positions against the lower reveal molding of the windshield when operation is arrested. The present invention relates to simplified variable throw crank means driven by a unidirectional electric motor in combination with control means for automatically increasing the throw of the crank to move the wiper blades to their depressed park positions and thereafter deenergize the motor. Accordingly, among my objects are the provision of windshield wiper actuating mechanism including double eccentric operated variable throw crank mechanism; the further provision of electric motor driven windshield wiper actuating mechanism including double eccentric operated variable throw crank means; and the still further provision of windshield wiper actuating mechanism including a unidirectional electric motor and electromagnetically controlled double eccentric operated variable throw crank means.

The aforementioned and other objects are accomplished in the present invention by embodying a pair of relatively rotatable eccentrics in the crank drive in combination with abutment means for controlling relative movement between the two eccentrics. Specifically, the actuating mechanism includes a unidirectional electric motor connected through a suitable gear reduction to an output shaft constituting the driving member. A first eccentric is keyed to the output shaft for rotation therewith, and a second eccentric is frictionally mounted on the first eccentric. A drive arm is rigidly connected to the output shaft and has an elongated radial slot adjacent its outer end for receiving a crank pin carried by a driven crank arm which is journalled on the second eccentric.

The second eccentric is formed on a disc having a pair of integral, circumferentially spaced, substantially radially extending lugs, or stops, these stops being radially spaced and coacting with an electromagnetically positioned latch or abutment. In addition, the disc is formed with an arcuate flange for actuating a parking switch to deenergize the electric motor when the wiper blades arrive at their depressed parked positions.

During normal running operation, the electromagnetically positioned latch is aligned with the radial gap between the two lugs on the disc such that rotation of the output shaft, the inner eccentric and the drive arm imparts rotation to the driven crank arm and the disc in unison. The throw of the driven crank thus remains constant and the wiper blades are driven throughout their normal running strokes between predetermined inboard and outboard stroke end positions. When the electromagnet is deenergized, the latch is spring biased so as to engage the outer lug on the disc thereby arresting rotation of the second eccentric during continued operation of the first eccentric and the drive and driven arms. In this manner the inner eccentric is rotated relative to the outer eccentric so as to increase the throw of the driven crank to maximum whereat the latch is again aligned with the radial gap between the two lugs on the disc. The wiper blades are simultaneously driven to their depressed park positions whereat the flange on the disc opens the parking switch to deenergize the motor.

When wiper operation is resumed, the electromagnetically positioned latch is moved into the path of the inner lug on the disc and upon rotation of the first eccentric and the drive and driven arms relative to the second eccentric, the throw of the crank is reduced to a minimum whereat the latch is again aligned in the radial gap between the two lugs on the disc. Accordingly, the second eccentric will be driven with the first eccentric while the throw of the crank remains substantially constant, and the wiper blades are oscillated throughout their running strokes.

Further objects and advantages of the present invention will be apparent from the following description, reference being had to the accompanying drawings, wherein a preferred embodiment of the present invention is clearly shown, and wherein like reference numerals denote like parts throughout the several views.

In the drawings:

FIGURE 3 is a fragmentary sectional view taken along lines 3—3 of FIGURE 2.

FIGURES 4, 5 and 6 are sectional views taken along lines 4—4, 5—5 and 6—6, respectively of FIGURE 3 showing the relative position of the several parts in the parked position.

FIGURE 7 is a fragmentary sectional view taken along line 7—7 of FIGURE 3.

Figure 8:
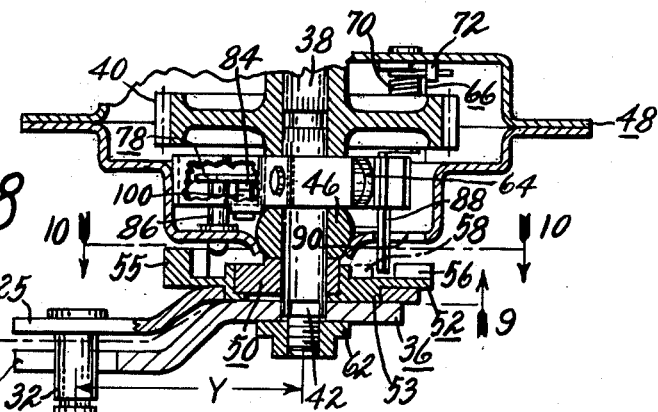

FIGURE 8 is a fragmentary sectional view similar to FIGURE 3 showing the parts in their running position.

Figure 10:
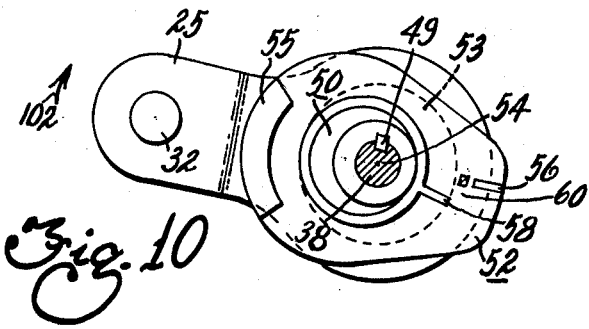
Figures 9, 11:
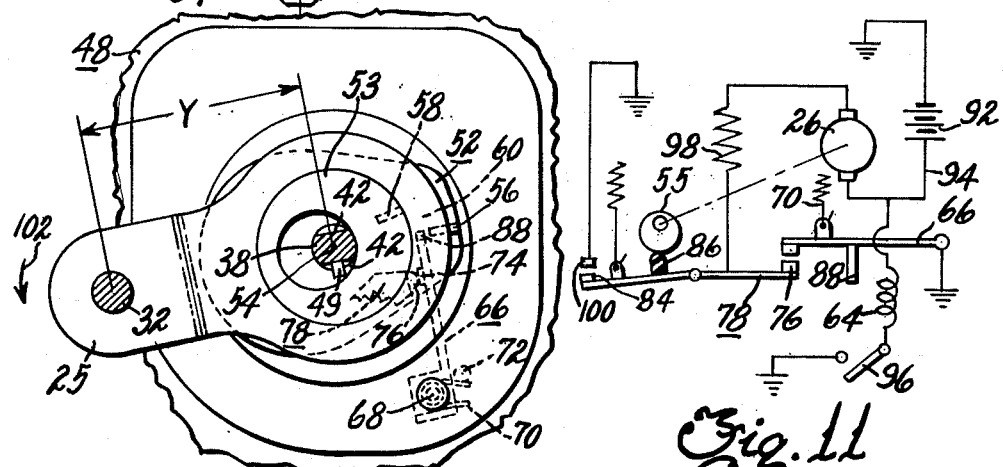

FIGURES 9 and 10 are sectional views taken along lines 9—9 and 10—10 of FIGURE 8.

FIGURE 11 is an electrical schematic of the energizing circuit for the wiper motor.

Figure 1:
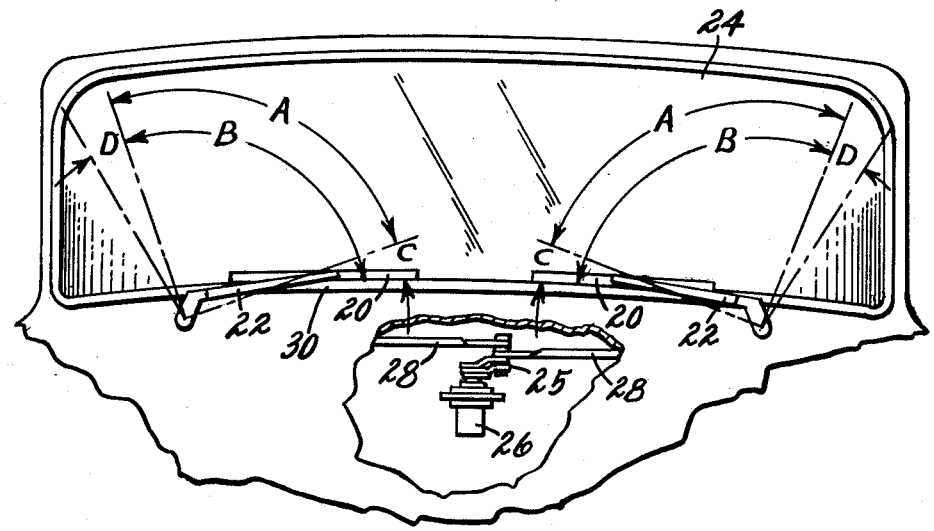
FIGURE 1 is a fragmentary view with certain parts broken away of a motor vehicle embodying the windshield wiper actuating mechanism of this invention.

With reference to FIGURE 1, a windshield wiper system for a vehicle is shown including a pair of wiper blades 20 carried by wiper arm 22 which are oscillated in phase opposition across the outer surface of a windshield 24. The wiper arms 22 are drivingly connected with a unidirectional rotary crank 25 driven by an electric motor 26 through a drive linkage including connecting links 28. The throw of the unidirectional rotary crank 25 can be varied so that during normal running operation the wiper blades 20 are oscillated throughout strokes A between predetermined inboard and outboard stroke end limits, and can be moved to depressed parked positions against the lower reveal molding 30 through a parking angle C from their normal inboard stroke end limits.

Figure 2:
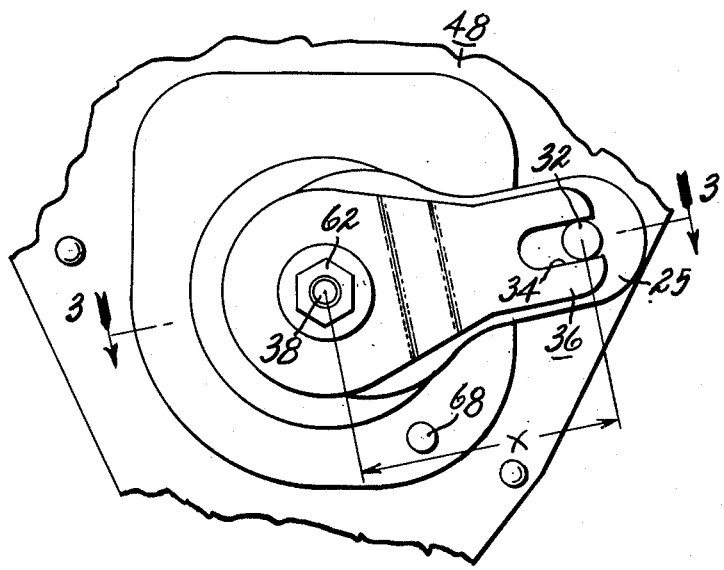
FIGURE 2 is a plan view of the wiper actuating mechanism.

As seen in FIGURE 2 the unidirectional rotary crank arm 25 carries an upstanding crank pin 32 having a portion disposed in an elongate radial slot 34 of a drive arm 36. The drive arm 36 is rigidly attached to a rotary output shaft 38 driven by the electric motor 26. The crank arm 25, constituting the driven member, is shown in its maximum throw position, i.e., the crank pin 32 is located a maximum radial distance X from the axis of shaft 38, in FIGURE 2. Moreover, the angular orientation of the crank arm 25 in FIGURE 2 is such that the wiper blades 22 will be at their depressed parked positions as shown in full lines in FIGURE 1.

With reference to FIGURE 3, the output shaft 38 has a spur gear 40 attached thereto constituting part of the gear reduction, the other gears of the reduction unit interconnecting the shaft 38 and the motor being omitted. The shaft has a pair of flats 42 adjacent its outer end which are received in a complementary opening in the drive arm 36 so that the drive arm 36 will rotate in unison with the shaft 38. The shaft 38 also has an axially extending keyway 44 aligned with one of the flats 42. The shaft 38 is journalled by a self-aligning bearing 46 within a sheet metal housing 48.

A circular eccentric 50 is drivingly connected to the shaft 38 by means of a key 49 which engages both the eccentric 50 and the keyway 44 of the shaft 38. The center 51 of the circular eccentric 50 is spaced a distance Z from the axis of shaft 38, as seen in FIGURE 5. A disc member 52 has a circular aperture, which receives and is frictionally journalled on the outer periphery of the inner eccentric 50 so as to be normally driven thereby. The disc member 52 has a circular eccentric rim portion 53 with a center 54. The member 52 also has an arcuate, axially extending lug 55 on one side, and a pair of axially extending, circumferentially spaced, substantially radial lugs, or stops, 56 and 58 located diametrically opposite the lug 55. The outer end of lug 58 is radially spaced from the inner end of lug 56 so as to define a radial gap 60 between the inner and outer ends thereof. The crank arm 25 has a circular aperture which receives and is rotatably journalled on the circular eccentric rim 53 of the member 52.

Accordingly, the drive for the crank arm 25 from the shaft 38 is through the drive arm 36 and the slot 34 which receives a portion of the crank pin attached to the crank arm 25. The several parts are maintained in assembled relation with the shaft 38 by a nut 62 which threadedly engages the end of the shaft and maintains the disc member 52 in frictional engagement with the inner eccentric 50.

An electromagnet coil and core assembly 64 is mounted within the cup-shaped portion of the housing 48 as seen in FIGURES 3 and 6. An armature 66 is pivotally mounted on a stud 68 carried by the housing 48, the armature 66 being biased in the clockwise direction by a torsion spring 70 as shown in FIGURE 6, against a stop pin 72 indicated in FIGURES 4 and 7. The armature 66 is electrically grounded and carries a contact 74 engageable with a stationary contact 76 carried by an armature bus bar 78. The bus bar 78 is insulated from and riveted at 80 and 82 to the cup-shaped housing 48 and has a free end carrying a contact 84 engageable with a housing carried contact 100 constituting a parking switch. The housing 48 is, of course, electrically grounded. An insulating pin 86, connected to the free end of the bus bar 78, projects through the housing 48 for operation by flange 55 of the disc member 52, as will be pointed out more particularly hereinafter.

The armature 66 is also formed with an axially extending abutment, or latch, 88 which projects through an elongate slot 90 in the housing 48 and coacts with the lugs 56 and 58 to control the relative positions of the eccentrics 50 and 53. When the electromagnet 64 is deenergized, the armature 66 and the abutment 88 are maintained in the full line position of FIGURE 6 by the torsion spring 70. However, upon energization of the electromagnet 64 the armature 66 and the abutment 88 are moved to the position indicated by phantom lines in FIGURE 6.

The several parts are shown in their parked positions in FIGURES 4 through 7, and in their running positions in FIGURES 8 through 10. The energizing circuit for the motor 26 is shown schematically in FIGURE 11 and comprises a battery 92 having one terminal connected to ground and the other terminal connected by wire 94 to one side of the armature of the motor 26 and one side of the electromagnet coil 64. The other side of the electromagnet coil 64 is connected to a manually operable switch 96. The armature 66 is shown electrically grounded with contact 74 disengaged from contact 76. The abutment 88 is shown integral with the armature 66. The bus bar 78 is connected to one end of the motor field winding 98, the other end of which is connected to the armature of the motor 26. The parking switch contact 84 is shown spaced from its grounded housing contact 100.

When the switch 96 is closed, the coil 64 is energized from the battery 92 through wire 94 and switch 96. Accordingly, the electromagnet will attract the armature 66 to engage contacts 74 and 76 thus completing the energizing circuit for the motor 26 from the battery 92 through the armature, the field winding 98, the bus bar 78, contacts 74 and 76, and the armature 66.

Now, with reference to FIGURES 4 through 6, when the electromagnet coil 64 is energized and the armature 66 is moved to the phantom line position shown in FIGURE 6, rotation of the shaft 38 and the drive arm 36 in the direction of arrow 102 will result in rotation of the disc 52 and the eccentric 53 with the eccentric 50 such that the throw of the crank 25 remains a maximum. At this time the center 54 of the eccentric 53 is located a distance 2Z from the axis of shaft 38. Accordingly, the wiper blades 20 will be driven from their depressed parked positions throughout the angles B + D beyond their normal outboard stroke end limits during the first 180° rotation of the crank arm 25. During the continued rotation of the crank arm 25 the wiper blades will be returned toward their parked positions. However, just prior to a complete revolution of the crank arm 25 with the eccentrics 50 and 25 as shown in FIGURES 4 and 5, the abutment 88 will intercept the lug 58 on the disc 52 and arrest rotation of the disc 52 and its eccentric 53. Accordingly, during the next substantially 180° rotation of the crank arm 25 and the eccentric 50, rotation of the disc 52 and the eccentric 53 will be arrested, but the disc 52 will be radially shifted so that when the crank arm 25 arrives at the position shown in FIGURES 9 and 10, the throw of the crank pin 32 will have been reduced to a minimum, namely, the radial distance Y. At this time the center 54 of the eccentric 53 is in approximate alignment with the axis of the shaft 38. As the eccentric 50 rotates relative to the eccentric 53 and thus shifts the disc 52 and its eccentric 53 radially, the abutment 88 is disengaged from the lug 58 and aligned with the radial gap 60 between the lugs 56 and 58, thus again freeing the disc 52 and its eccentric 53 for rotation with eccentric 50 and the crank arm 25.

The wiper blades 20 are moved throughout the angle B, namely from the depressed parked position to their normal outboard stroke end limits during the time disc 52 is restrained against rotation. When disc 52 is again freed for rotation with the eccentric 50, the center of the eccentric 53 is in approximate alignment with the axis of shaft 38 and rotation of the crank 25 results in oscillation of the wiper blades 20 throughout their normal running strokes A. During this movement of the disc 52 relative to the eccentric 50, the arcuate flange 55 on the disc is moved out of the path of the plunger 86 for actuating the parking switch, and accordingly due to its inherent resiliency, the free end of the bus bar 78 will engage contact 84 with the ground contact 100.

When the manual switch 96 is opened, so as to discontinue operation of the wipers, the electromagnet coil 64 is deenergized thus permitting the torsion spring 70 to move the armature 66 from the position of FIGURE 9 to the position of FIGURE 4. The immediate effect of pivotal movement of the armature 66 is merely to separate contacts 74 and 76, while energization of the motor 26 is continued through closed contacts 84 and 100. When the electromagnet is deenergized, the abutment 88 on the armature is positioned so as to intercept the stop 56 on the disc 52 just prior to the wiper blades reaching their normal outboard stroke end limits as shown in FIGURES 9 and 10.

Accordingly, rotation of the disc 52 will be arrested and during continued rotation of the crank arm and the eccentric 50, the throw of the crank pin 32 will be increased to a maximum due to radial shifting movement of the disc 52 by reason of the center 54 of the eccentric 53 being displaced throughout twice the radial distance Z from the axis of the shaft 33. This radial shifting movement of the disc 52 moves the flange 55 radially inwardly into engagement with the plunger 86 of the parking switch so as to move the free end of bus bar 78 upwardly as seen in FIGURE 3 and thus separate contacts 84 and 100 to deenergize the motor when the wiper blades arrive at their depressed parked positions as shown in FIGURE 1. The abutment 88 is disengaged from the stop 56 just prior to the wiper blades arriving at their depressed parked positions and again aligned with the radial gap 60 between the lugs 56 and 58. In effect, the flange 55 constitutes a cam engageable with the plunger 86 for actuating the parking switch to deenergize the motor 26 when the wiper blades arrive at their depressed parked positions.

While the embodiment of the invention as herein disclosed constitutes a preferred form, it is to be understood that other forms might be adopted.

What is claimed is as follows:

1. Windshield wiper actuating mechanism including, a rotatable driving member, first and second eccentrics frictionally coupled together for rotation in unison but capable of relative rotation, one of said eccentrics being attached to said driving member for rotation therewith, a crank journalled on the other eccentric, means operatively connecting said driving member and said crank for imparting rotation thereto, and means operable to effect relative rotation between said eccentrics to vary the throw of said crank.

2. Windshield wiper actuating mechanism including, a rotatable driving member, first and second eccentrics frictionally coupled together for rotation in unison but capable of relative rotation, one of said eccentrics being attached to said driving member for rotation therewith, a crank journalled on the other eccentric, a drive arm connected to said driving member for rotation therewith, means operatively connecting said drive arm and said crank for imparting rotation thereto, and means operable to effect relative rotation between said eccentrics to vary the throw of said crank.

3. Windshield wiper actuating mechanism including, a rotatable driving member, first and second eccentrics frictionally coupled together for rotation in unison but capable of rotation relative to each other, one of said eccentrics being attached to said driving member for rotation therewith, a crank journalled on the other eccentric, a drive arm connected to said driving member, a pin and slot connection between said drive arm and said crank for imparting rotation to said crank, and means operable to effect relative rotation between said eccentrics to vary the throw of said crank.

4. Windshield wiper actuating mechanism including, a rotatable driving member, a first eccentric attached to said driving member, a second eccentric frictionally mounted on said first eccentric so as to normally rotate therewith, a crank journalled on said second eccentric, means operatively connecting said driving member and said crank for imparting rotation thereto, and means operable to arrest rotation of said second eccentric during continued rotation of said eccentric and said crank to vary the throw of said crank.

5. Windshield wiper actuating mechanism including, a rotatable driving member, a first eccentric attached to said driving member, a second eccentric frictionally mounted on said first eccentric so as to normally rotate therewith, a crank journalled on said second eccentric, a drive arm attached to said driving member, a pin and slot connection between said drive arm and said crank for imparting rotation to said crank, and means operable to arrest rotation of said second eccentric during continued rotation of said first eccentric and said crank to vary the throw of said crank.

6. Variable throw crank mechanism for actuating a windshield wiper including in combination, a rotatable shaft, a first eccentric connected to said shaft, for rotation therewith, a second eccentric frictionally mounted on said first eccentric so as to normally rotate therewith, a crank journalled on said second eccentric, mean operatively connecting said shaft and said crank for imparting rotation thereto, and latch means engageable with said second eccentric for arresting rotation thereof for a fraction of a revolution of said first eccentric and said crank to vary the throw of said crank and thereafter release said second eccentric for rotation with said first eccentric.

7. Variable throw crank mechanism for actuating a windshield wiper including in combination, a rotatable shaft, a first eccentric keyed to said shaft, a disc having a second eccentric frictionally mounted on said first eccentric so as to normally rotate therewith, said disc having a pair of radially spaced lugs thereon, a crank journalled on said second eccentric, a drive arm connected to said shaft, a pin and slot connection between said drive arm and said crank for imparting rotation thereto, and latch means selectively engageable with said lugs for arresting rotation of said disc for a fraction of a revolution of said first eccentric and said crank and thereafter automatically releasing said disc for rotation with said first eccentric so as to vary the throw of said crank.

8. Variable throw crank mechanism for actuating a windshield wiper including in combination, a rotatable shaft, a first circular eccentric keyed to said shaft, a disc having a circular aperture frictionally receivinging the first circular eccentric so as to normally rotate therewith and having a second circular eccentric portion, a crank arm having a circular aperture within which the second circular eccentric portion of said disc is disposed and about which said crank arm is journalled, said disc having a pair of upstanding lugs with a radial gap therebetween, a drive arm attached to said shaft, a pin and slot connection between said drive arm and said crank for imparting rotation thereto, and latch means selectively engageable with the upstanding lugs on said disc for arresting rotation of said disc for a fraction of a revolution of said first eccentric and said crank and thereafter automatically release said disc for rotation with said first eccentric by alignment of said latch means with said radial gap and thus vary the throw of said crank by aligning or displacing the center of the second circular eccentric portion with respect to the axis of said shaft.

9. Variable throw crank mechanism for actuating a windshield wiper including in combination, a rotatable shaft, a first circular eccentric attached to said shaft with the center of said eccentric radially spaced from the axis of said shaft, a disc having a circular aperture for frictionally receiving the first circular eccentric so as to normally rotate therewith and having a circular eccentric rim portion, said disc having a pair of circumferentially spaced axially extending lugs, said lugs being radially spaced to define a gap therebetween, a crank having a circular aperture receiving the circular eccentric rim portion of said disc and having a crank pin at its outer end, a drive arm attached to said shaft and having a slot for slidably receiving said crank pin so as to impart rotation to said crank during rotation of said shaft, and abutment means normally aligned with the radial gap between said lugs on said disc and selectively movable into engagement with one or the other of said lugs to arrest rotation of said disc for a fraction of a revolution of said first eccentric and said crank so as to either align the center of said circular eccentric circular rim with the axis of said shaft or displace it a maximum amount from the axis of said shaft and thus vary the throw of the crank.

10. Windshield wiper actuating and control mechanism including, a unidirectional electric motor, a rotary driving member connected to said motor, an energizing circuit for said motor including a running switch and a parking switch connected in parallel, an electromagnet for controlling said running switch and a manual switch for controlling energization of said electromagnet, a rotary crank, means operatively connecting the driving member and said crank for imparting rotation thereto, double eccentric means arranged between said driving member and said crank for varying the throw thereof, means automatically operable to effect relative rotation of said double eccentric means upon energization and deenergization of said electromagnet, the arrangement being such that the throw of said crank is increased to a maximum when the electromagnet is deenergized and reduced to a minimum when the electromagnet is energized, and means operable to open said parking switch when the throw of said crank is a maximum to deenergize said motor.

11. The combination set forth in claim 10 wherein said double eccentric means comprises a first eccentric attached to said driving member and a second eccentric frictionally mounted on said first eccentric so as to normally be driven thereby but capable of rotation relative thereto.

12. The combination set forth in claim 11 where said second eccentric is carried by a disc having a pair of radially spaced lugs, wherein said electromagnet includes an armature and wherein said armature has an abutment selectively engageable with said lugs upon energization and deenergization of said electromagnet so as to selectively arrest rotation of said second eccentric to vary the throw of said crank.

13. The combination set forth in claim 11 wherein said second eccentric is carried by a disc having a flange constituting an actuator for said parking switch, said disc being radially shiftable upon relative rotation between said eccentrics to enable said flange to actuate said parking switch.

14. Windshield wiper actuating and control mechanism including, a unidirectional electric motor, an energizing circuit for said motor including parallel connected running and parking switches, an electromagnet which when energized, closes said running switch and when deenergized, opens said running switch, and a manual switch for controlling the energization of said electromagnet, a rotatable driving member connected to said electric motor, first and second eccentrics frictionally coupled together for rotation in unison but capable of relative rotation, one of said eccentrics being attached to said driving member for rotation therewith, a crank journalled on the other eccentric, means operatively connecting the driving member and said crank for imparting rotation thereto, means operable to effect relative rotation between said eccentrics upon deenergization of said electromagnet to increase the throw of said crank during continued rotation of said driving member, and automatically operable means for opening said parking switch when the throw of said crank is a maximum.

15. Windshield wiper actuating mechanism including, a first eccentric, a second eccentric mounted on said first eccentric, a rotatable driving member, said first eccentric being attached to said driving member for rotation therewith, a crank journalled on said second eccentric, means operatively connecting the driving member and the crank for imparting rotation thereto, and means operable to effect relative rotation between said eccentrics to vary the throw of said crank.

References Cited in the file of this patent

UNITED STATES PATENTS

| | | |
|---|---|---|
| 2,934,965 | Perry | May 3, 1960 |
| 2,959,968 | Gute et al. | Nov. 15, 1960 |